O. G. MEREDITH.
ANIMAL TRAP.
APPLICATION FILED MAR. 26, 1918.
1,291,591.
Patented Jan. 14, 1919.
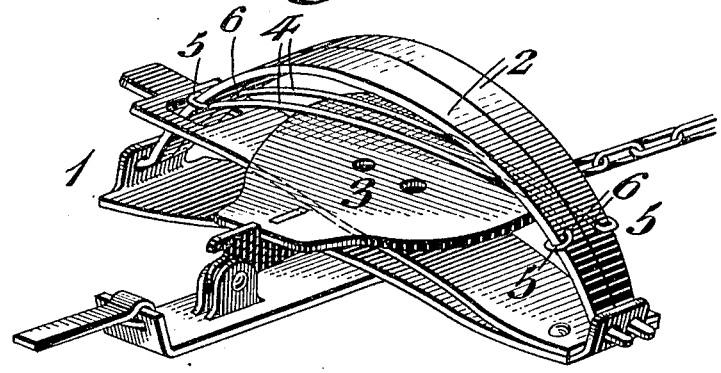
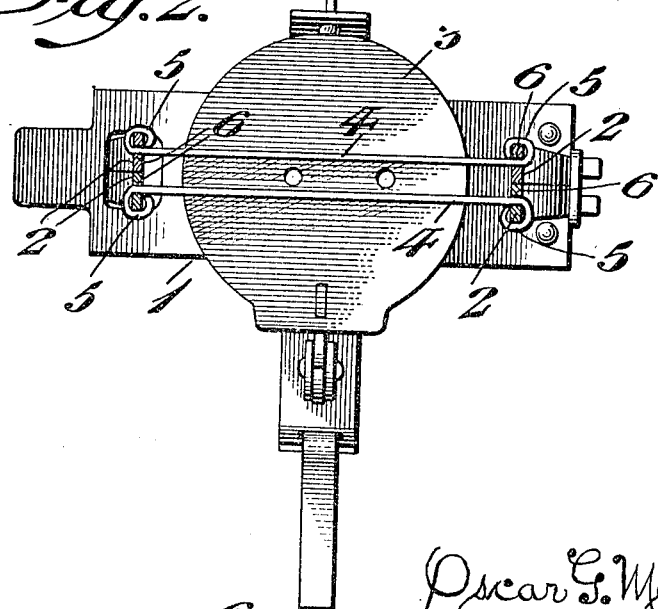
INVENTOR
Oscar G. Meredith.
BY
Wiedersheim & Fairbanks
ATTORNEYS.

UNITED STATES PATENT OFFICE.

OSCAR G. MEREDITH, OF EAST GOSHEN TOWNSHIP, CHESTER COUNTY, PENNSYLVANIA, ASSIGNOR OF ONE-THIRD TO HARRY F. TAYLOR, OF EAST GOSHEN TOWNSHIP, PENNSYLVANIA, AND ONE-THIRD TO NEVILLE HUNSBERGER, OF PHILADELPHIA, PENNSYLVANIA.

ANIMAL-TRAP.

1,291,591.  Specification of Letters Patent.  Patented Jan. 14, 1919.

Application filed March 26, 1918. Serial No. 224,723.

*To all whom it may concern:*

Be it known that I, OSCAR G. MEREDITH, a citizen of the United States, residing in a citizen of the United States, residing in East Goshen township, in the county of Chester, State of Pennsylvania, have invented a new and useful Animal-Trap, of which the following is a specification.

My invention relates to an improvement in animal traps known as spring or steel traps, and has for its object the prevention of the animal caught from gnawing himself free. To this end the invention consists of a guard which is connectible with the jaws of the trap and formed in an inexpensive, simple, easily-applied, removable, and readily-replaceable manner, without adding material weight to the trap, as will be hereinafter set forth.

The invention is satisfactorily illustrated in the accompanying drawing but the important instrumentalities thereof may be varied, and so it is to be understood that the invention is not limited to the specific details shown and described, as long as they are within the spirit or scope of the claims.

Figure 1 represents a perspective view of an animal trap embodying my invention.

Fig. 2 represents a top or plan view thereof.

Fig. 3 represents a transverse section of portions of the jaws showing therein openings for a purpose to be hereinafter described. Fig. 4 represents a modification.

Similar numerals of reference indicate corresponding parts in the figures.

Referring to the drawings:—

1 designates an animal trap, the same being composed of the arch-shaped springing jaws 2—2, the bait pan 3 and appurtenances for setting and springing said jaws, as well known in a trap of the kind.

4 designates guards composed of pieces of wire or other suitable light but strong material which are interposed in the space between the underside of the jaws 2 and the top of the pan 3, and have their terminals formed with the eyes 5 which are fitted in openings 6 in said jaws below the crowns thereof and retained on the walls of said openings, it being seen that said pieces are stretched across the aforesaid space so as to divide the same into upper and lower portions by said pieces as divisional lines for such portion, either portion being insufficient for an animal to introduce his mouth therefor in to reach a limb that may be caught by the jaws and gnaw the same from the jaws and consequently free itself from the trap, this being resorted to by certain kinds of animals such as skunks, opossums, etc.

It will be seen that the guards are constructed of simple and inexpensive means, the same being easily applied in position by forming the openings 6 in the jaws as shown most plainly in Fig. 3, and by providing the eyes 5 on the terminals of the pieces comprising said guards and inserting said eyes into said openings and clasping them securely around the walls of the latter and the adjacent portions of the jaws, as most plainly shown in Fig. 2.

Should the guards require renewal they may be readily removed by bending out the eyes and withdrawing them from the openings 6, the effect of which is evident, after which new guards may be substituted and applied and secured as hereinbefore stated.

In existing traps, jaws of the kind may have openings such as 6 drilled or bored therein and as the guards are formed of wire which is pliable in its nature, they may have their terminal eyes fitted in said openings and bent around the same and the adjacent portions of the jaws, thus securing the guards in operative position on the jaws as in the previous instance, this requiring but little of a workman's skill or expensive tools therefor, yet nicely accomplishing its purpose. Then, owing to the pliable nature of the guards 4, the latter are not harsh in holding the limbs of the animal that has been caught, and so avoids additional pain to the animal, the pain being sufficiently great due to the sprung condition of the jaws 2 on the limbs, as has been stated.

Again, the guards are arch-shaped and conform to the arch shape of the jaws 2, whereby their crowns are sufficiently close to each other to prevent the protrusion of the noses of the animals through the spaces between the jaws and bait pan to reach the trapped limb while the jaws 2 sufficiently hold the same.

As the guards are connected with the jaws in the firm and reliable manner the animal cannot disengage the former from the latter by pressing its head or mouth forcibly against the same. Furthermore the guards serve to brace the jaws and prevent them from opening to an extent sufficient to allow the animal to pull out the caught member through the same and so escape. Again, while the wire guard members 4 simply close to some extent the space between the jaws and bait pan to prevent the animal from entering his nose and so his mouth into said space so as to gnaw off the limb that has been caught by the jaws as has been stated, said members are not harsh in their nature in holding said limb and so adding to the pain of the animal, still the guards are sufficiently strong as not to yield to the nose or mouth of the animal, and as they are connected rigidly on their ends with the jaws, they cannot turn at said ends on the latter and so be moved in opposite directions to be separated or opened apart or to permit the mouth of the animal to reach the limb that is caught.

In Fig. 4 I show the guards riveted to the jaws, in lieu of the eyes employed in the previous figures as the means for connection of said guards in position. In this case when said guards are to be removed the heads 7 of the same are filed or cut off when as is evident. the guards may be withdrawn from the jaws through the openings 6.

It will be noted that the guards are disposed in the same vertical plane as the jaws 2—2 when the latter are in their closed position and are relatively fixed thereto so as not to change such relative position when the jaws are moved.

Having thus described my invention what I claim as new and desire to secure by Letters Patent, is:—

1. In an animal trap having spring operated jaws and a bait pan below the crown thereof, guards formed independent of said jaws of pliable material and disposed in the plane of the crown of the jaws with their end portions engaged removably on said jaws and joining the same.

2. In an animal trap having spring operated arched jaws and a bait pan below the crowns thereof, guards for the purpose stated independent of said jaws arch-shaped to conform to the arch shape of the jaws and adapted to occupy the space in the trap between said pan and crowns, said jaws having therein openings adapted to receive the terminal portions of said guards, said guards being fixed relatively to and in the plane of said jaws and said portions being engageable with the walls of said openings and the portions of the jaws adjacent to said openings, said terminal portions of the jaws being immovably fixed to the adjacent portions of said jaws.

3. In an animal trap having spring operated jaws and a bait pan below the crown thereof, said jaws being arch-shaped, guards arch-shaped to conform to the arch shape of the jaws with their ends formed with eyes adapted to enter said jaws and to clasp the walls thereof, said guards formed of pliable material independent of said jaws and disposed in the plane of the crown thereof.

OSCAR G. MEREDITH.

Witnesses:
JOHN E. JOHNSON,
WM. WILLIAMS.

Copies of this patent may be obtained for five cents each, by addressing the "Commissioner of Patents, Washington, D. C."